United States Patent
Haggard et al.

(10) Patent No.: US 7,066,428 B1
(45) Date of Patent: Jun. 27, 2006

(54) UNFOLDING WING FOR AIR-LAUNCHED, LOW SPEED AIR VEHICLES

(76) Inventors: Roy A. Haggard, 29335 Jarrell Ct., Nuevo, CA (US) 92567; Roger L. McCracken, 25321 Ridgeplume Dr., Murrieta, CA (US) 92563

( * ) Notice: Subject to any disclaimer, the term of this patent is extended or adjusted under 35 U.S.C. 154(b) by 0 days.

(21) Appl. No.: 10/794,626

(22) Filed: Mar. 8, 2004

(51) Int. Cl.
*B64C 3/56* (2006.01)

(52) U.S. Cl. .......................................... 244/49; 244/13
(58) Field of Classification Search .................. 244/49, 244/3.27, 13
See application file for complete search history.

(56) References Cited

U.S. PATENT DOCUMENTS

| | | | | |
|---|---|---|---|---|
| 2,811,323 A | * | 10/1957 | Rethorst | 244/2 |
| 4,579,297 A | * | 4/1986 | Ayoola | 244/2 |
| 4,627,585 A | * | 12/1986 | Einstein | 244/2 |
| 5,356,094 A | * | 10/1994 | Sylvain | 244/49 |
| 5,836,541 A | * | 11/1998 | Pham | 244/2 |
| 6,260,798 B1 | * | 7/2001 | Casiez et al. | 244/49 |
| 2003/0089821 A1 | * | 5/2003 | Miralles et al. | 244/49 |

FOREIGN PATENT DOCUMENTS

| | | | | |
|---|---|---|---|---|
| FR | 532566 | * | 2/1922 | 244/49 |
| GB | 635259 | * | 5/1950 | 244/49 |

* cited by examiner

*Primary Examiner*—Tien Dinh
(74) *Attorney, Agent, or Firm*—Frank C. Price

(57) ABSTRACT

A wing is presented that unfolds in a chordwise direction upon the launch of its aircraft at some velocity as it is projected into the air or launched from a moving craft at altitude. The wing is made up of two or more stiff, upper segments including the leading edge with foam used to complete the underneath wing shape. The foam is covered with a film of plastic or composite material to makeup the underneath shape of the wing as supported by the foam. The foam can be pressurized to enhance its final shape in support of the underneath film. The upper segments are joined by hinges using twisted, staked pins to provide force for the desired wing unfolding. Aerodynamic forces also enhance the unfolding motion. The wing can be used on a craft to be deployed at higher air speeds than any other type of folding wing of comparable stowing efficiency.

10 Claims, 3 Drawing Sheets

UNFOLDING WING FOR AIR-LAUNCHED, LOW SPEED AIR VEHICLES

No Federally sponsored research funds were used in the creation of the material of this application.

BACKGROUND OF THE INVENTION

This invention is a folding wing for an aircraft wherein the wing unfolds at the root upon the launching of the aircraft at some velocity or as it is ejected at altitude from a carrier craft. The wing swings out from the fuselage and then expands in the chordwise direction. Wings that deploy by pivoting at the root are common on cruise missiles. However, for some types of air vehicles that must fly for long periods at relatively low speed there is a need for more wing area than that of designs for use with cruise missiles. This invention provides a chordwise expansion of the wing upon launching of the vehicle. The chordwise expansion of this invention allows as much as three times greater wing area with the same craft stowed volume as with other unfolding, stowed wings.

SUMMARY OF THE INVENTION

The unfolding wing of this invention consists of an upper surface with three parts connected by two hinges. The wing has a flexible lower surface membrane supported by an interior open-cell foam. The interior foam defines the shape of the lower surface of the wing. The foam may be pressurized by a gas system to improve the shape definition, especially when the foam is cold and stiff at the time of deployment.

The upper surface parts of the wing are rigid and may be made of any suitable metal, plastic or composite. The other elements may be made of lightweight materials according to the particular design requirements.

Compared to other types of deployable wings, the wing of this invention has superior strength and stiffness as it is first pivoted away from the fuselage and during chordwise unfolding/expansion. Further, augmentation of the unfolding action of the wing is created by using twisted, staked hinge pins in the hinges between the various upper surface segments and augmentation also comes from aerodynamic forces tending to straighten out the unfolding wing. This unfolding wing can be deployed at much higher airspeeds than can be any other of its type with comparable stowing efficiency.

BREIF DESCRIPTION OF THE DRAWINGS

DETAILED DESCRIPTION

Figure 1:
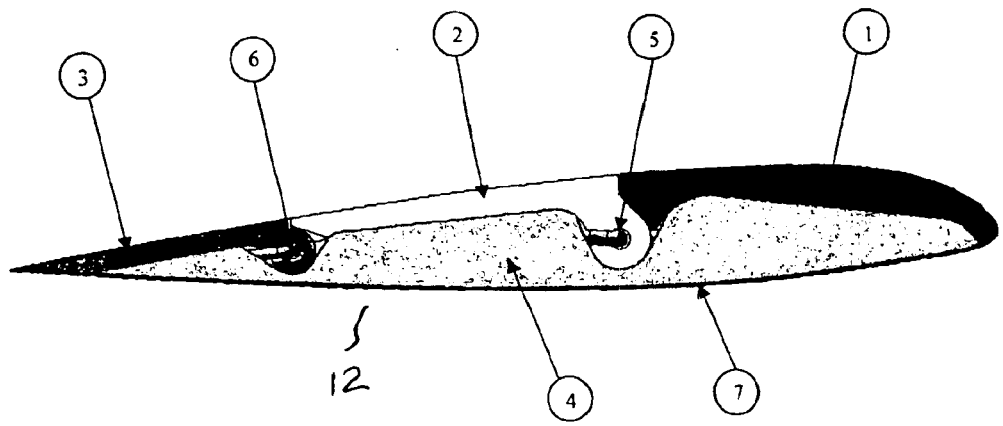
FIG. 1 is a cross section of the unfolded wing.

In FIG. 1 can be seen the fully unfolded wing 12 with three segments 1,2, and 3 that comprise the upper portion. These are manufactured from rigid material such as aluminum. The leading edge segment 1 is connected to mid-chord segment 2 by hinge pin 5. Mid-chord segment 2 is connected to trailing edge segment 3 by hinge pin 6. Flexible membrane 7 is bonded to flexible foam 4 and these two parts comprise the bottom portion of the wing. Hinge pins 5 and 6 are installed staked in a twisted condition to provide torque in the wing unfolding direction in order to enhance the required wing-unfolding once it is initiated.

Figure 2:
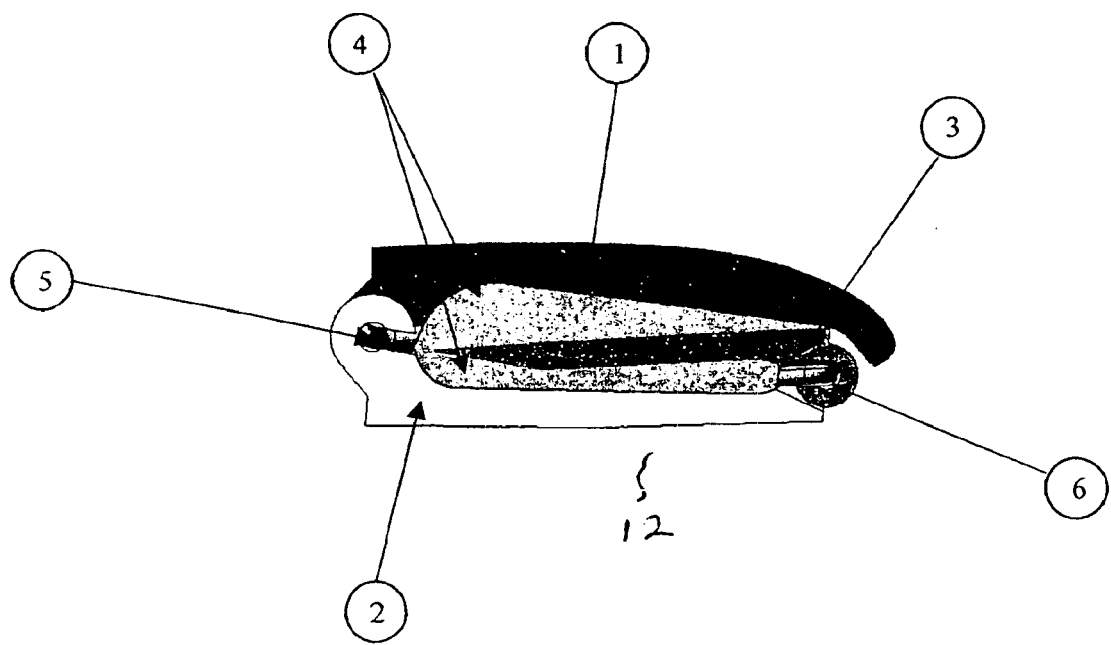
FIG. 2 is a cross section of the wing folded for storage.

In FIG. 2 can be seen the wing 12 in its fully folded (for storage) condition. The chord length in this folded condition is approximately ⅓ the unfolded length as shown in FIG. 1. Trailing edge segment 3 is folded against mid-chord segment 2 by its pivoting around hinge pin 6. The folded segments 2 and 3 are folded against leading edge segment 1 by pivoting around hinge pin 5 and compressing the flexible foam 4. This compresses the flexible foam 4 into a smaller volume compared to its expanded volume when the wing 12 is fully unfolded.

Figure 3:
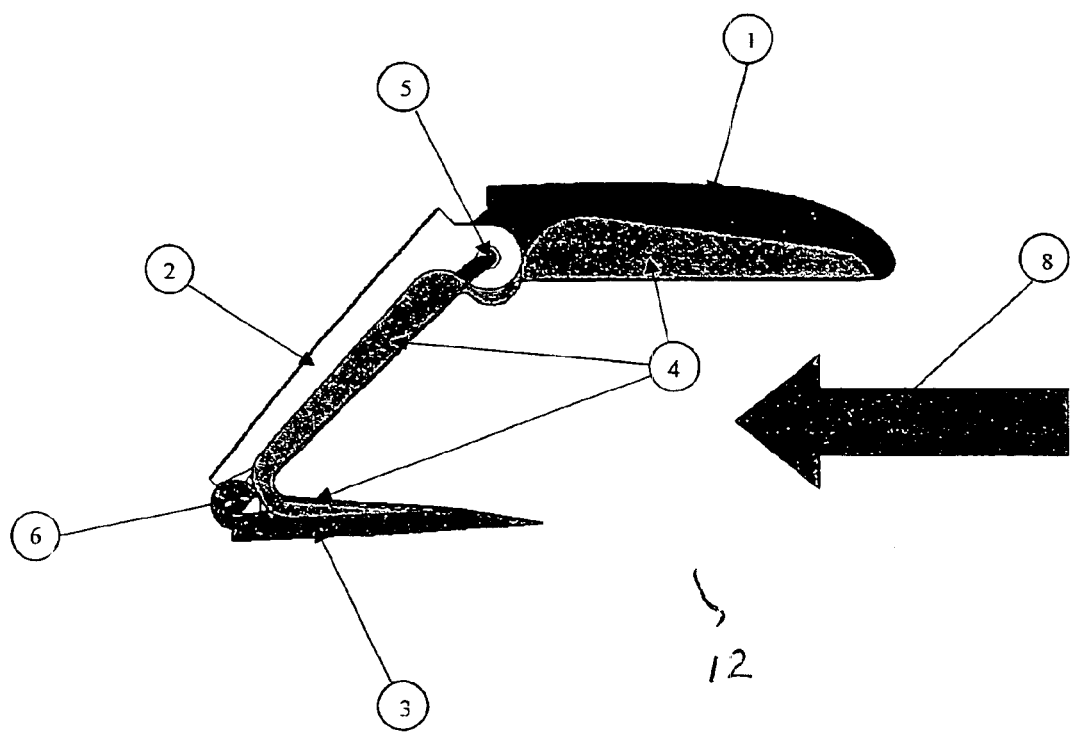
FIG. 3 is a cross sectional view of the partially unfolded wing.

In FIG. 3 the wing 12 is in a state of being unfolded. It is midway between folded and unfolded. It can be seen that impact air 8 from the wing's motion through the air during unfolding, the wing 12 moving from left to right (air moving relatively right to left 8), adds forces onto the wing's components in the direction of unfolding.

Figure 4:
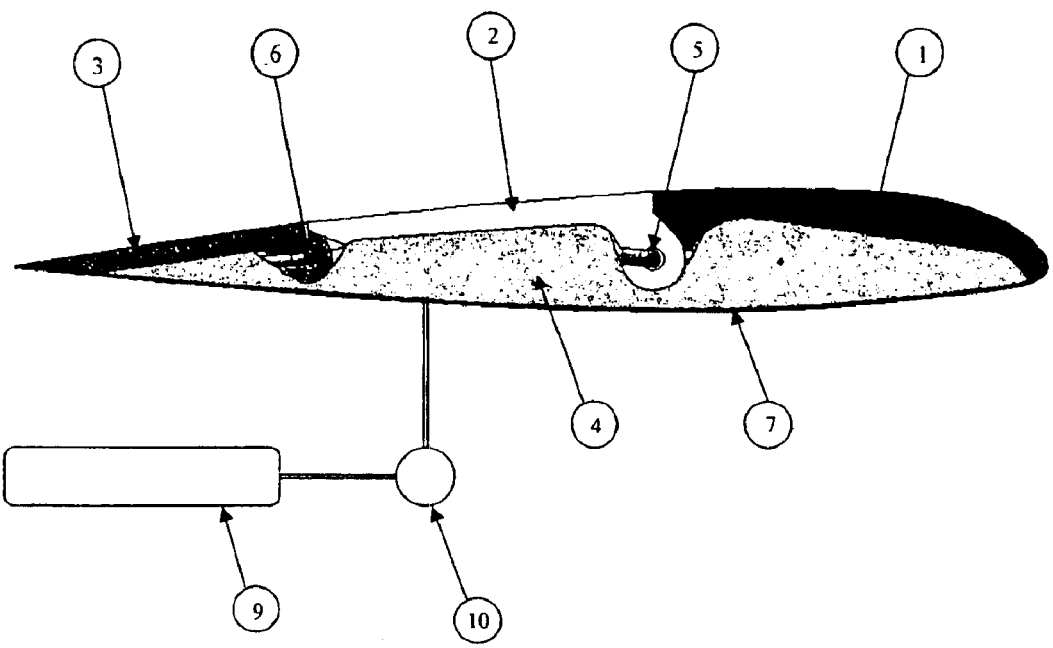
FIG. 4 is a representation of the wing to show diagrammatically its unfolding being facilitated with a pressuring capability for the foam portion of the wing.

In FIG. 4 a cylinder 9 of compressed gas with control means 10 is connected to the volume of flexible foam 4 to enhance the complete expansion of foam 4 to the point of establishing the desired contour of flexible membrane 7. The membrane 7 can be made of plastic film. It can be made of fabric coated with plastic film.

Figure 5:
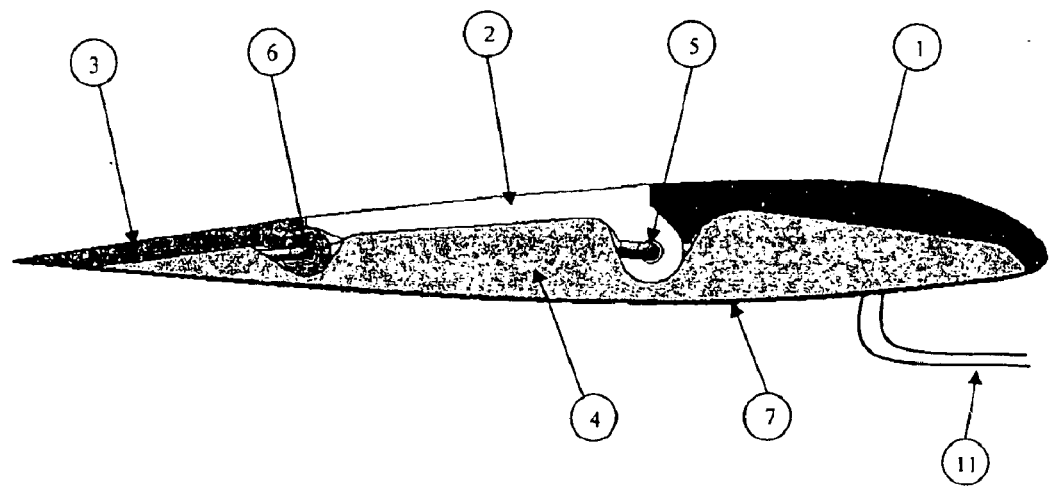
FIG. 5 shows diagrammatically the wing with its foam pressurization being driven by impact air collected with a scoop.

In FIG. 5 can be seen an air scoop 11 to provide dynamic pressure with the wing in motion to pressurize flexible foam 4 in order to assist flexible membrane 7 to return to the defined lower surface contor more rapidly against positive external pressure.

While the figures show a wing with three hinged segments to allow folding, two or any larger number of segments might be used in a design under this invention. While it might be argued that this invention is obvious in the light of hinged wings of other forms that are known, this invention uses a unique folding geometry that compresses the foam structure of the wing within the folding members. The use of a combination of rigid and flexible elements is a key part of the novelty. The use of a foam-backed membrane to define the lower surface of the wing is unique among other folded wing designs.

What is claimed is:

1. A wing that folds and unfolds in a chord-wise direction comprising:

an upper and a lower surface, said upper surface comprising two or more segments, one of said segments defining the leading edge shape of said wing, additional segments extending behind said leading edge segment, said segments lying adjacent to one another, each pair of adjacent segments connected by a hinge whose axis is aligned in the span-wise direction, said upper surface defining an interior space underneath, said lower surface comprising a flexible membrane bonded to flexible foam, said flexible foam being cut to a shape to fit within said interior space under said upper surface and to define the shape of said lower membrane according to the desired airfoil shape, said upper surface segments forming a smooth upper surface of the desired airfoil shape when unfolded, said upper surface segments folding along said hinge axis inward to create a reduced chord length for wing stowage.

2. The folding wing of claim 1 in which said flexible membrane is a plastic film.

3. The folding wing of claim 1 in which said flexible membrane is made of fabric coated with plastic film.

4. The folding wing of claim 1 in which said flexible foam is an open-cell foam.

5. The folding wing of claim 1 in which a pressurized gas system is used to fill said foam to define better said lower surface shape.

6. The folding wing of claim 1 in which said leading edge segment is made of aluminum.

7. The folding wing of claim 1 in which said leading edge segment is made of carbon fiber composite.

8. The folding wing of claim 1 in which said upper surface segments lying behind said leading edge segment are made of composite material.

9. The folding wing of claim 1 in which said upper surface segments lying behind said leading edge segment are made of plastic.

10. The folding wing of claim 1 in which said hinges include long wire pivot pins, said pins being staked at each end in a twisted condition such that they function with torsion to augment the unfolding motion of said segments.

* * * * *